Feb. 28, 1961

R. C. McKEE 2,972,848

CORN HARVESTING MACHINE

Filed Nov. 12, 1958

INVENTOR
RUSSELL C. McKEE

BY: *Frederick E. Browley*
ATTORNEY

Feb. 28, 1961  R. C. McKEE  2,972,848
CORN HARVESTING MACHINE
Filed Nov. 12, 1958  3 Sheets-Sheet 2
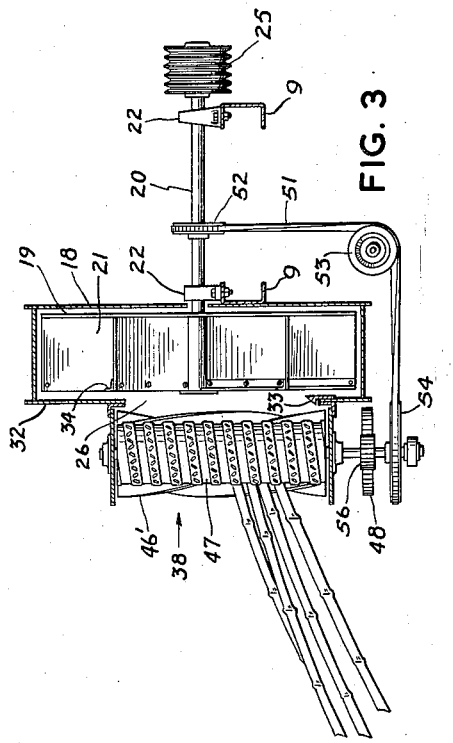
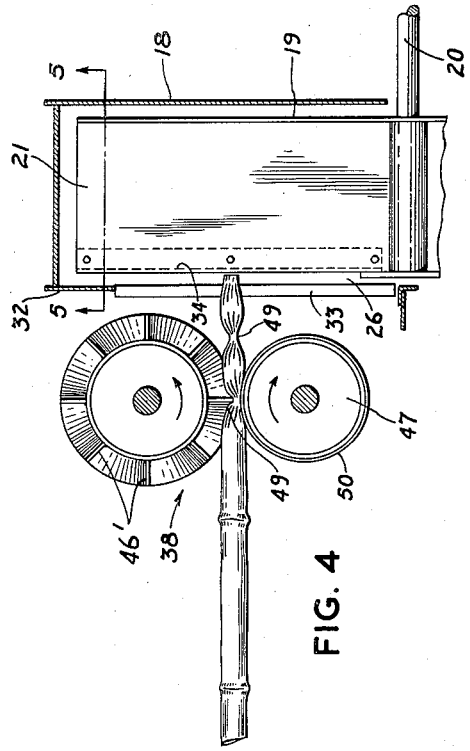
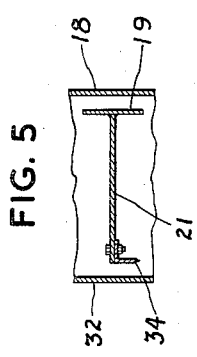
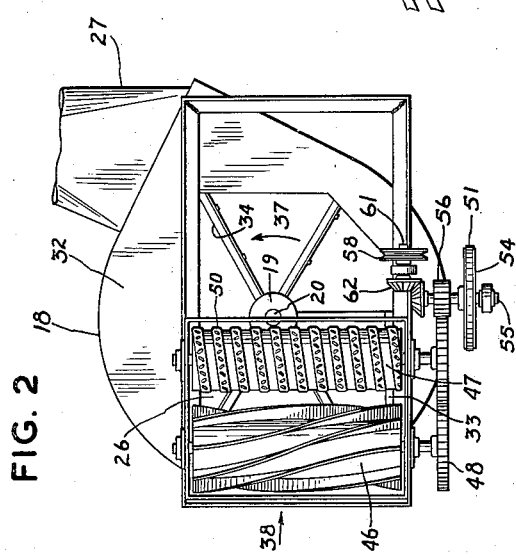
INVENTOR
RUSSELL C. McKEE
BY: Frederick C. Bromley
ATTORNEY

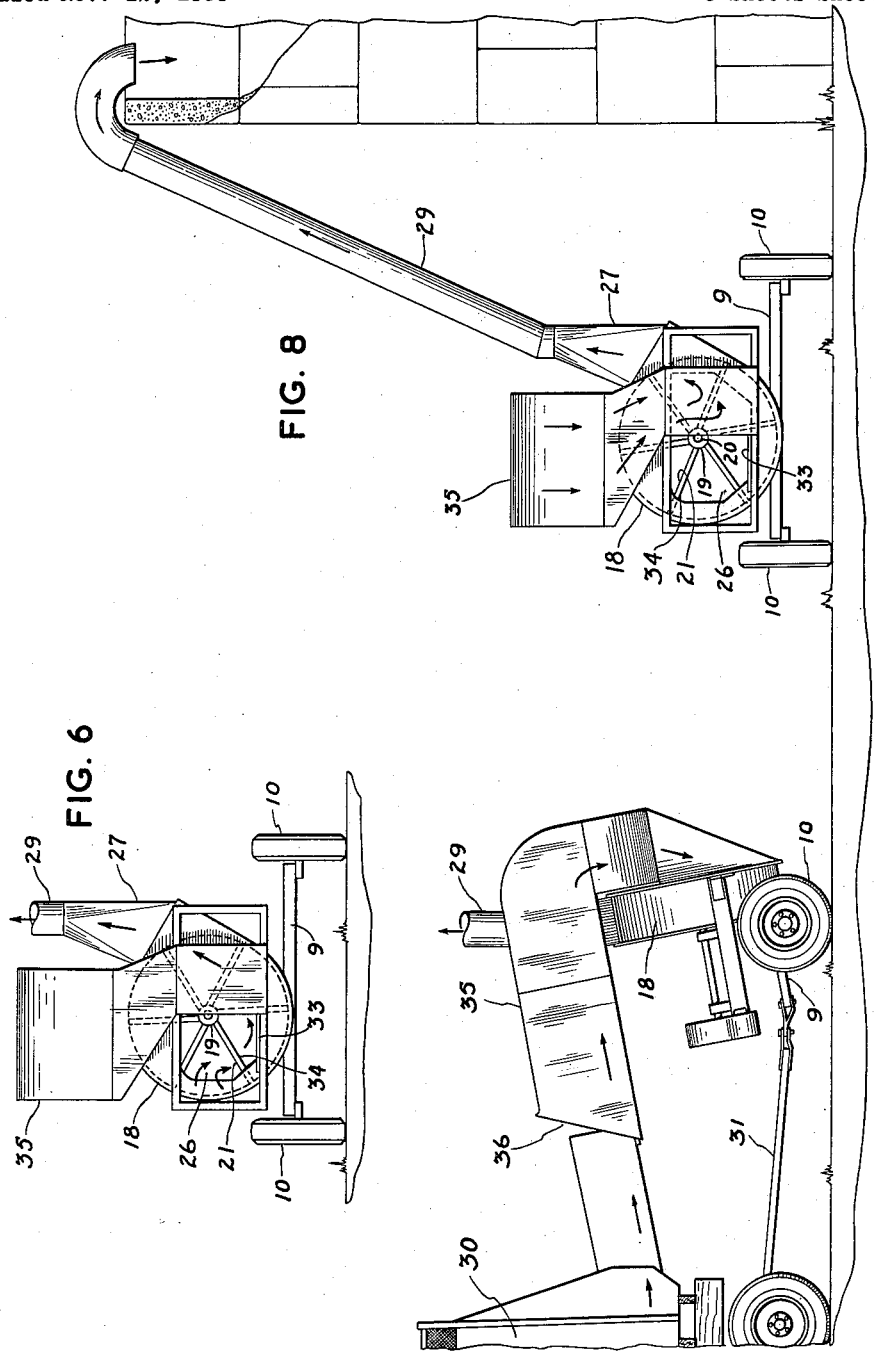

United States Patent Office 2,972,848
Patented Feb. 28, 1961

2,972,848
CORN HARVESTING MACHINE
Russell C. McKee, Elmira, Ontario, Canada
Filed Nov. 12, 1958, Ser. No. 773,455
7 Claims. (Cl. 56—16)

My invention relates to improvements in corn harvesting machines for silage production. The invention particularly concerns a conventional machine of this kind which is hauled over the land as by a tractor and provided with a standard row crop attachment by which standing corn is cut and conveyed to a fan supplied with knives by which the corn stalks are chopped or severed into short cube-like lengths and then conveyed through a duct to a trailing wagon wherein the material is received until a load is accumulated. The harvesting machine also functions as an unloader and for this purpose is equipped with an unloading intake leading to the fan and controlled by a gate which in one position closes off the corn stalk receiving opening and opens up an ingress to the unloading intake so that the fan may receive and act on silage material transferred from the wagon to the unloading intake. For the purpose of unloading, the corn harvesting machine, along with the trailing wagon, is hauled to a silo or barn and the duct which extends from the fan to the wagon is disconnected from the wagon and connected to suitable unloading piping on the silo or barn. The attendant takes the material from the wagon and feeds it into the unloading intake in order that the fan may elevate material to the silo or barn.

It is well recognized that in a particularly dry season, accumulation or dense mass of the cube-like silage cuttings in the storage silo, will cause mould. Such mould is attendant upon the trapping of air in the silage and consequent bacteria growth. It has been established that by treating corn stalks to a crushing process immediately prior to shredding them the resultant silage not only compacts much better in the silo, but does not have any tendency to mould and therefore loss from mouldy silage is obviated.

Hence it is a primary object of my invention to produce a harvesting machine of the class referred to in which garnered corn is converted into an improved silage by treating it to a crushing operation and then shredding it by knives associated with the impeller of the fan.

A further and important object is to provide a harvesting machine wherein upright crushing rollers are interposed between the row crop attachment and the fan ingress and desirably vertically arranged and driven to provide a nip by which corn stalks are acted on in a crushing operation by means of companion rollers of which at least one of the rollers is supplied with spaced crushing blades and desirably the other roller is supplied with a roughened surface to co-act with the blades. Desirably the rollers are driven synchronously by meshing spur gears and a transmission having a connection with the power take-off shaft by which the fan and the row crop attachment are driven.

A still further object of the invention is to provide in a harvesting machine of the character involved including upright rollers, means on at least one of said rollers for raising the crop as it is crushed to obviate the impaction of material being directed to a shredder and impeller.

A further object of the invention is to provide a highly serviceable and efficient machine of the kind described and one which is economical to manufacture. With these, and subsidiary objects in view, the invention consists in the novel combination and arrangement of parts as described in the ensuing specification and illustrated in the accompanying drawings, in which:

Fig. 2 is a transverse view taken along the line 2—2 of Figure 4, and showing the crushing rolls on a somewhat larger scale, but omitting details of the structure in order to depict the invention to better advantage;

Fig. 3 is a side elevation of Fig. 2, and showing the power transmission for the rollers in the form of a belt drive connected to the impeller shaft of the fan;

Fig. 4 is a top plan view of Fig. 3 on a larger scale and showing how the crushing of the corn stalks is effected with a portion of the fan broken away;

Fig. 5 is a detail on 5—5 of Fig. 4 showing a knife on the impeller of the fan;

Fig. 6 is a front view of the machine omitting the row crop attachment and the rollers but depicting more particularly the connection of the unloading intake with the fan;

Fig. 7 is a side view of Fig. 6 showing how the unloading intake is connected to the wagon for an unloading operation; and Fig. 8 is a similar view to Fig. 6, but showing how the outlet duct of the fan is connected to piping leading to the silo for filling the silo in an unloading operation of the wagon.

Figure 1:
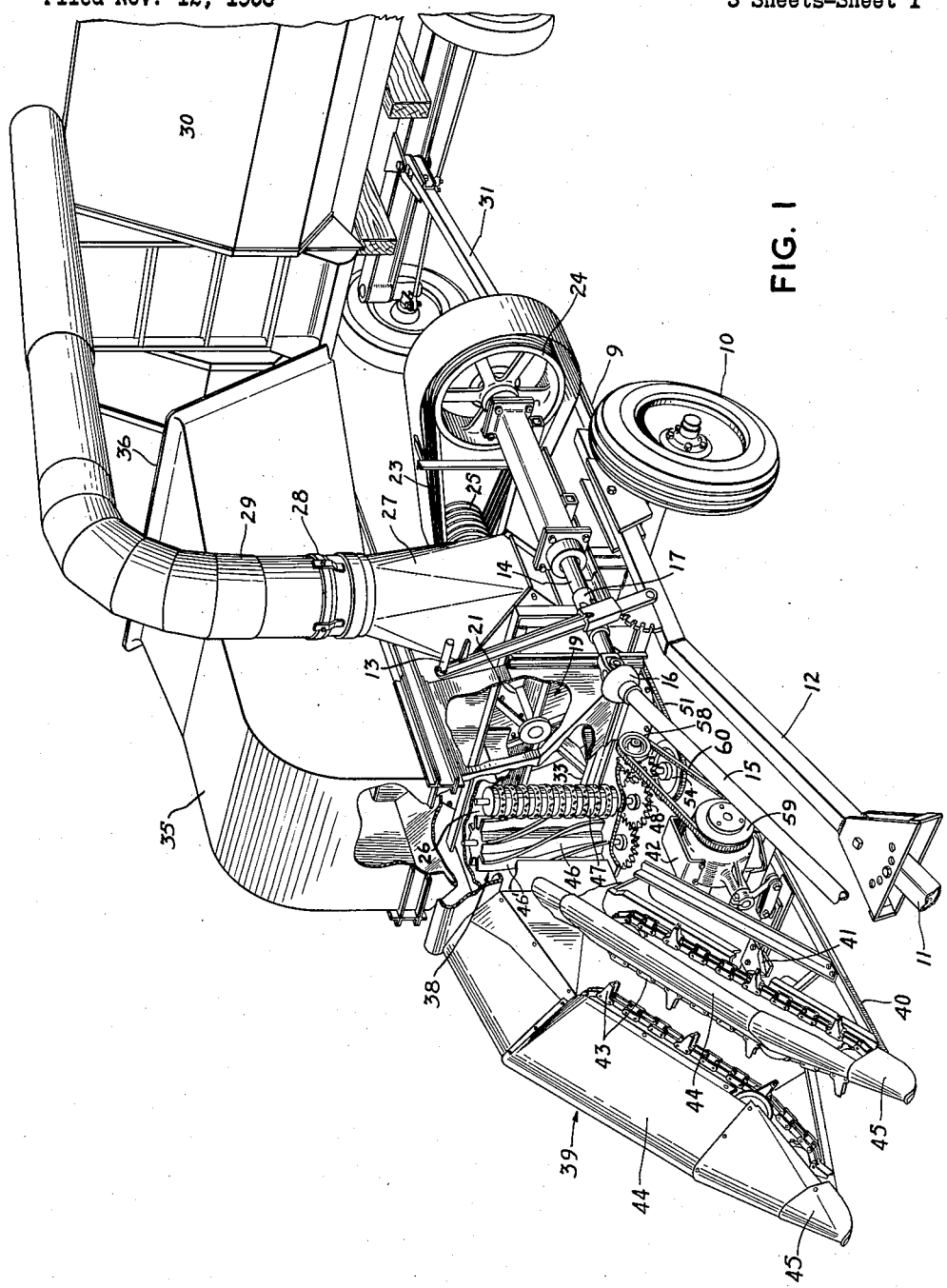
Fig. 1 is a general perspective view of the corn harvesting machine attached to a following box-type trailer and showing parts broken away in order to more clearly illustrate the invention.

The general structure of the harvesting machine depicted in the drawing is given by way of illustration but not of limitation. It comprises a supporting unit in the form of a wheeled frame generally denoted at 9 of which the land wheels are indicated at 10 and are of the rubber-tired variety. A pair of such wheels are employed and they are journalled on a shaft as usual which forms a part of the frame. The hitch 11 is also a part of the frame and connects with the drawbar of the tractor and extends from the frame bar 12 located at one side of the machine whereby the machine travels in offset relation with respect to the tractor.

Machines of this kind usually embody pick-up height control such as that indicated at 13 which per se does not form a part of the instant invention. The power take-off shaft is disposed at one side of the machine as usual and is formed in two parts 14 and 15 connected by a universal joint 16. The part 14 is journalled on the frame and the part 15 is free at one end to make a connection with the power take-off of the tractor as is well understood in the art. The part 14 may embody a drive overrun of a conventional character such as that indicated at 17.

The fan housing is denoted at 18 and this is fixed on the frame 9 in approved manner. In the housing there is journalled by means of a shaft 20 a bladed impeller 19 which is driven anti-clockwise and supplied with the radial blades indicated at 21. The impeller has its axis extending longitudinally of the machine and the shaft 20 extends rearwardly of the fan housing and is suitably journalled as at 22 by means of bearings supported on the frame 9, see Fig. 1.

Power is taken off the section 14 of the drive shaft for operating the impeller. The transmisison is in the form of a belt drive preferably of the V-type comprising the V-belts 23, the drive pulley 24 and the driven pulley 25.

One of the side walls of the fan housing is a front wall and this is provided with a material receiving opening located at one side of the axis of the impeller for receiving corn stalk material which has been crushed, as will be presently described, ready for a shredding operation. This material receiving opening is denoted at 26 and is located at the far side of the impeller axis with respect to the discharge outlet 27 as will be best seen by an inspection of Figure 6. The discharge opening or outlet 27 extends upwardly and tangentially and is connected by a detachable connection 28 to a delivery duct 29 in the form of the customary piping. For the purpose of loading a wagon in the harvesting of corn, this duct extends to a following trailer 30 of the box type which is connected by a hitch 31 as customary—see Figure 1.

For the shredding of corn there is provided on the front wall 32 of the fan housing at the lower edge portion of the material receiving opening 26 a ledger plate 33 which co-acts with knives 34 on the blades 21 of the impeller 19 to chop the corn stalk material in a shredding operation whereby the received corn stalks are desirably cut into short lengths, say, of about one-half inch long. The knives 34 extend radially of the edge portions of the blades adjacent the front fan wall 32 and have a downward cutting action in co-operation with the ledger plate which is horizontally arranged. Since the knives are carried by the impeller blades they rotate in unison with the impeller and therefore they may be regarded as rotary knives located in a plane parallel to the said ledger plate.

Since a harvesting machine of this kind is usually a dual purpose implement capable of performing a loading operation and an unloading operation, it is equipped with a crop intake duct from the trailer 30 which is denoted at 35 and extends rearwardly from the fan housing and terminates in a mouth portion 36 controlled by a hinged flap as customary (not shown). The unloading duct 35 communicates with the interior of the fan by means of an opening as at 37 provided in front wall 32 of the housing 18 which opening is disposed on the opposite side of the impeller axis with respect to the intake opening 26, and there is provided a suitable gate or flap for control of the opening 37. Such a gate or flap is well known in the art and may be of the hinged type or on the other hand it may be a slidable member and in any case is manually controlled in order that the opening 37 may be closed off when the intake duct is not in use.

The corn stalk crushing mechanism is generally denoted at 38 and this apparatus is interposed between the fan ingress opening 26 and the means for feeding corn stalk material as it is cut in the normal harvesting operation. The corn stalk feeding mechanism is in the form of a standard row crop attachment generally indicated at 39. This attachment comprises a sub-frame 40 attached to the main frame 9 in advance of the fan and supplied with a sickle knife 41 reciprocated by the usual actuating mechanism 42 and co-acting with the fixed knives (not shown) as will be well understood in the art.

The corn stalks are fed upwardly toward the opening 26 by the co-acting gathering chains 43 and these are associated with the usual fenders 44 provided with shoe runners 45 at their frontal ends. The corn stalks are fed butt first toward the opening 26 in the fan and this material is obliged to pass through the crushing mechanism 38 before entering the opening 26.

The crushing mechanism comprises a pair of gapped or spaced crushing rollers 46 and 47 having parallel axes and each journalled in the main frame 9 at their upper and lower ends by means of suitable bearings. The crushing rollers are disposed immediately in front of the opening 26 and have their nip in alignment with the row crop attachment 39. The rollers are connected together by spur gears 48 at their lower ends so that they operate in unison and rotate in opposite directions whereby material is fed between them as it is received from the row crop attachment, which material is introduced into the opening 26 as it leaves the crushing rollers. The roller 46 is supplied with a peripheral series of spaced blades 46' of a pitch to produce a crushing effect on a corn stalk such as that indicated at 49 in Figure 4 about every three inches of its length. Preferably the blades are helical and have a coarse pitch which blades extend from hub portion of a cylindrical configuration. The crushing rollers have the additional function of raising the harvested crop vertically, see Figure 3, out of the way of the crop subsequently moved toward the rollers by the row crop attachment 39.

The other roller 47 is shown as provided with a roughened peripheral surface preferably helical in character which roughened surface is supplied by embossing as indicated at 50. While in practice it has been ascertained the helical blades of the one roller co-acting with the roughened surface of the other roller produce a very desirable crushing action, it is not intended to restrict the invention to the specific peripheral surfaces of these rollers, since modification in this respect may be resorted to without departing from the spirit and scope of the invention. The crushing of the corn stalks separates fibres and acts to preserve the foliage material and obviates mould forming in the silage and in this way, produces a better quality of silage for cattle.

Power means are provided for connecting the rollers to the power take-off shaft and to this end the connection is made with the impeller shaft 20 by means of a belt 51 engaged with a pulley 52 thereon and trained over an idler 53 and engaged with a driven pulley 54 keyed to a stub shaft 55 which carries a pinion 56 in mesh with one of the spur gears 48 which are attached to the rollers respectively. Accordingly, it will be manifest that the rollers are driven in unison with the impeller and rotate in opposite directions to feed material to the fan. As the corn stalks are fed into the opening 26 in the housing the knives on the impeller operate to chop the material in a shredding operation and desirably the shredding operation is carried out by cutting the stalks into short lengths of about one-half inch long or thereabouts. The material as it is cut within the fan housing is propelled by the impeller to the egress duct 27 and through the delivery pipe 29 to the wagon.

The actuating mechanism 42 belonging to the row crop attachment 39 is driven by a belt and pulley drive comprising the pulleys 58 and 59 engaged by the belt 60. Pulley 58 is made fast on a stub shaft 61 connected to the miter gears 62, one of which is driven by the shaft 55 which forms a part of the belt drive for the rollers.

The specific driving mechanism with the various moving parts may of course be modified according to the dictates of manufacture.

In the operation of the machine for harvesting corn, it is hauled by a tractor and the garnered corn is cut and delivered to the crushing rollers which in turn feed it to the knives within the fan housing where it is shredded and acted on by the impeller so as to be delivered to the wagon. It will be understood that when the wagon is loaded the harvester, along with the wagon, is drawn to a silo or barn and then the piping is directed to make a connection with the top of the silo as indicated in Figure 8 for the feeding of material thereto. The intake duct 35 is brought into use and the contents of the wagon are fed by the operator into this intake so that the material will be conveyed by the fan to the silo or barn as the case may be in the dual use of the machine.

The advantages and utility will be manifest to those skilled in the art and it is not intended that the invention shall be restricted to the specific disclosure herein made, but that such changes and variations may be taken advantage of as fairly come within the scope of the appended claims.

What I claim is:

1. A corn harvesting machine comprising a supporting unit, a fan fixed thereon having a driven impeller rotatable on a longitudinal axis within a housing, said housing having an ingress offset relative to said axis and a tangential egress for material such as corn stalks, a ledger plate supported at said ingress, rotary knives within said housing and rotatable in unison with said impeller, said knives disposed in a plane parallel to said ledger plate for co-acting therewith in the chopping of corn stalk material introduced into said ingress, co-acting crushing rollers journalled on vertical axes of rotation on said supporting unit in front of said ingress outside of said housing and providing a nip means for raising the crushed corn stalk material delivered from a source of supply, whereby the crushed material is fed into said ingress in the movement of said rollers, and means for driving said rollers.

2. The structure of claim 1; said knives extending radially from said axis and including a cutting edge disposed in a plane parallel to said ledger plate.

3. The structure of claim 1; and a row crop attachment mounted on said supporting unit and connected to a source of power for cutting and feeding corn stalk material to said crushing rollers.

4. The structure of claim 1; said rollers being mounted on parallel axes of rotation.

5. The structure of claim 1; at least one of said crushing rollers having a peripheral series of helically disposed crushing blades extending longitudinally thereof, and said other roller including a roughened peripheral surface helically disposed circumferentially thereabout, and drive means connected between said rollers for driving them in opposite directions.

6. In a corn harvester, in combination, a support frame, crop pickup-and-feed means on said frame, an enclosed crop shredding-and-discharge means on said frame including an impeller rotatable on a longitudinal axis and a tangential discharge opening offset from said axis, and power means drivingly connected to said means for operating the same, said crop shredding-and-discharge means including an inlet behind said crop crushing means and offset from said axis, said crop crushing means being disposed outside of an adjacent said enclosed crop shredding-and-discharge means in alignment with said inlet, said crop crushing means comprising a pair of elongated rollers journalled on vertical axes of rotation and including portions for distributing crops to said inlet.

7. The structure of claim 6; one of said rollers including at least one helically disposed crushing blade extending longitudinally thereof, and said other roller including a crushing surface cooperating with said blade.

References Cited in the file of this patent

UNITED STATES PATENTS

| | | |
|---|---|---|
| 2,442,520 | Van Sickle | June 1, 1948 |
| 2,651,162 | Whisler | Sept. 8, 1953 |